(12) United States Patent
Lerenc (10) Patent No.: US 8,768,614 B2
(45) Date of Patent: Jul. 1, 2014

(54) INCREASING THROUGHPUT FOR CARPOOL ASSIGNMENT MATCHING

(75) Inventor: Vedran Lerenc, Schoenau (DE)

(73) Assignee: SAP AG, Walldorf (DE)

( * ) Notice: Subject to any disclaimer, the term of this patent is extended or adjusted under 35 U.S.C. 154(b) by 252 days.

(21) Appl. No.: 13/329,899

(22) Filed: Dec. 19, 2011

(65) Prior Publication Data

US 2013/0158861 A1  Jun. 20, 2013

(51) Int. Cl.
*G01C 21/26* (2006.01)

(52) U.S. Cl.
USPC .............................. 701/410; 705/5

(58) Field of Classification Search
USPC ......... 701/410, 400, 516, 527; 705/5–6, 7.13, 705/7.15, 7.16
See application file for complete search history.

(56) References Cited

U.S. PATENT DOCUMENTS 6,363,352 B1 *  3/2002  Dailey et al. ................. 705/7.19
7,082,402 B2 *  7/2006  Conmy et al. ............... 705/7.19

* cited by examiner

*Primary Examiner* — Dalena Tran (74) *Attorney, Agent, or Firm* — Kenyon & Kenyon LLP

(57) ABSTRACT

Distances between locations traveled by a carpool driver in a carpooling system may be initially estimated by calculating direct, straight line distances between each of the location points. Travel speeds may also be initially estimated using an expected maximum vehicle speed, which may be a maximum speed limit. An estimated travel time may then be calculated from this data to initially designate passengers as eligible or ineligible for carpooling with a carpool driver.

18 Claims, 8 Drawing Sheets

FIG. 1

(PRIOR ART)

FIG. 2

(PRIOR ART)

INCREASING THROUGHPUT FOR CARPOOL ASSIGNMENT MATCHING

BACKGROUND

Automated carpooling systems have been used to match potential drivers having cars that are willing to carpool with one or more passengers who are seeking rides. In existing carpooling systems potential drivers and passenger submit messages, notifications, or other entries to the carpooling system. These entries may include a starting or pickup location, an ending or dropoff location, a date/time range during which the traveling may occur, a passenger capacity of the driver's vehicle, and a maximum travel time the driver is willing to accept during carpooling.

Figure 1:
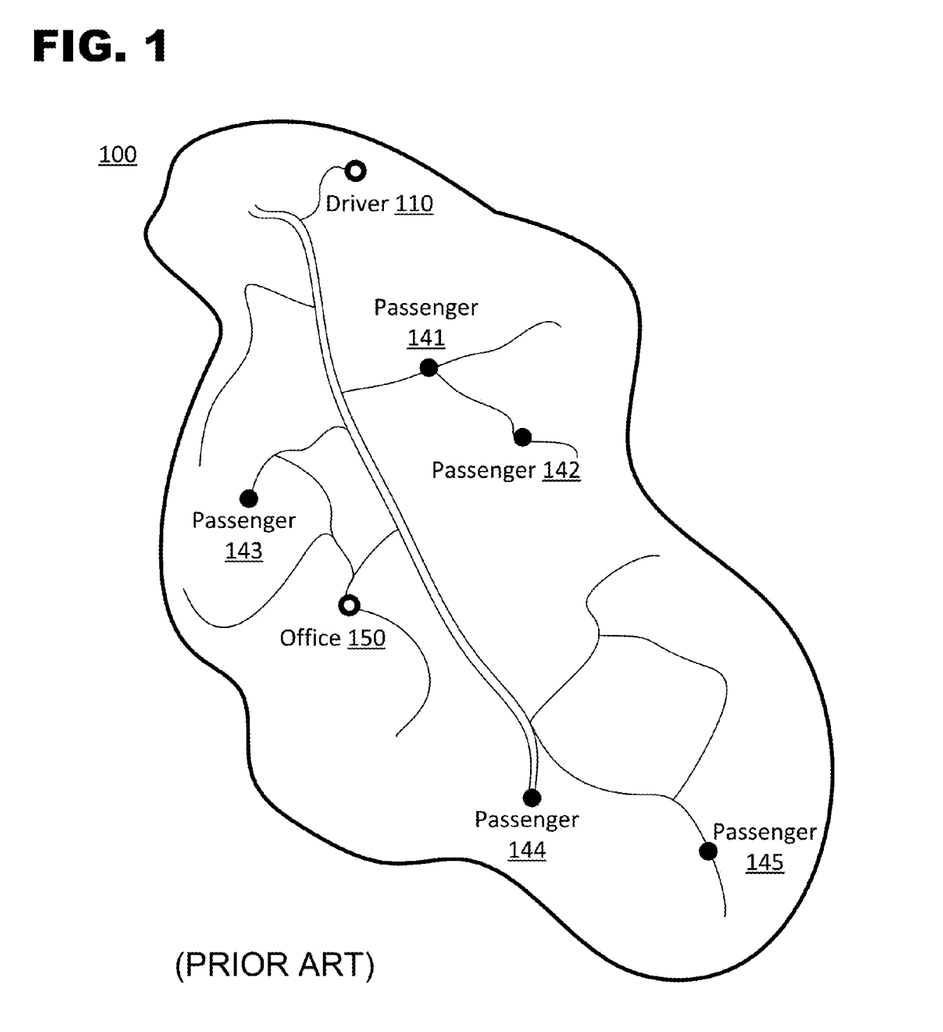
FIG. 1 shows an exemplary road map.

FIG. 1 shows an exemplary road map 100 showing a highway, represented by the two parallel lines and an assortment of streets, represented by the single lines. The highway may have a speed limit that is twice the speed of the streets. The map 100 also shows the starting locations of a carpool driver 110, five passengers 141 to 145, and an office 150, which may be the final destination for all of the participants 110 and 141 to 145 in this example.

Existing carpooling systems have used optimization algorithms to match drivers and passengers. These existing optimization algorithms calculated the road distance that a carpool driver has to travel in order to reach each of the passengers seeking a ride. The existing algorithms may then calculate an estimated travel time for the carpool driver to reach each passenger by applying an expected speed or speed limit to the calculated road distance in order to calculate the travel time.

Figure 2:
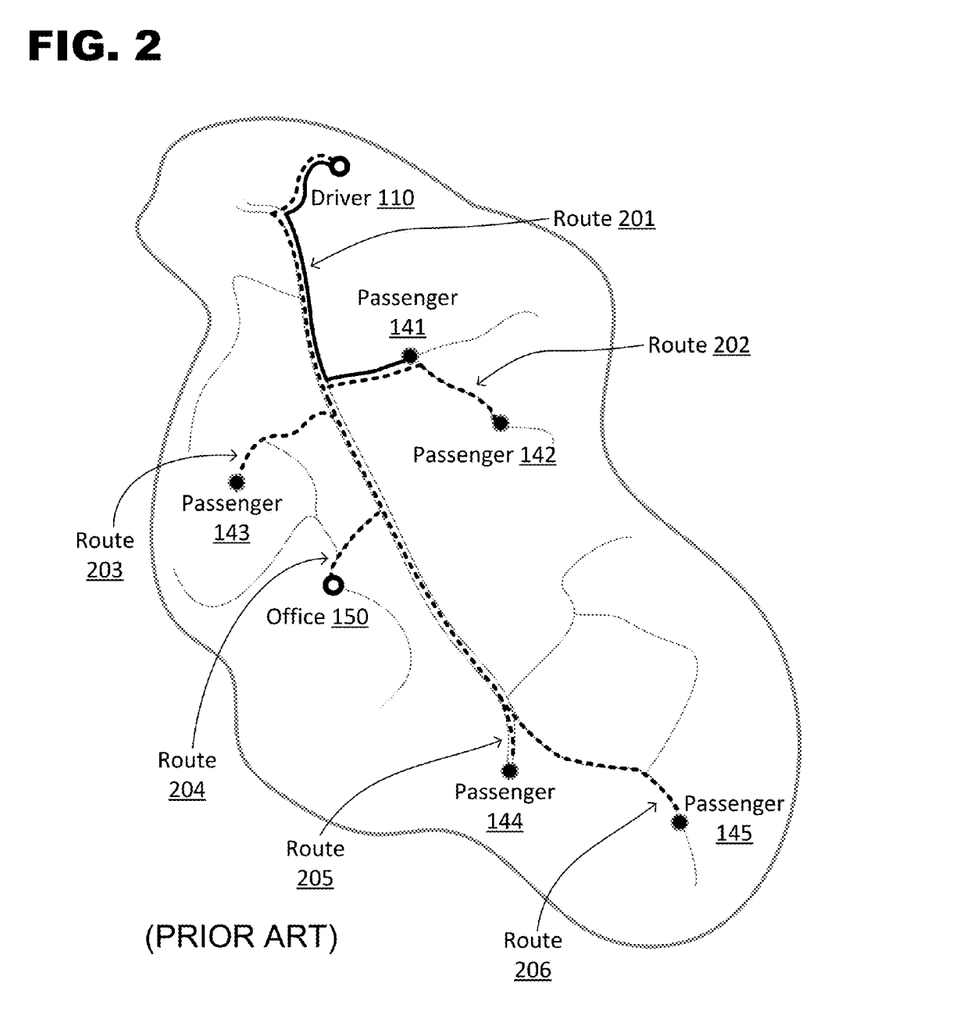
FIG. 2 shows an example of how road distances have been calculated in the past.

FIG. 2 shows an example of how road distances have been calculated in the past. In FIG. 2, road distances were calculated from each route 201, 202, 203, 205, and 206 between the driver 110 and each of the passengers 141 to 145, and then each route to the office 150 from the passengers 141 to 145. Thus, route 201 would be used to calculate the road distance between driver 110 and passenger 141. Thereafter, a route 204 from passenger 141 to the office 150 would be determined to calculate the additional road distance from passenger 141 to office 150, and then calculate a total road distance for picking up passenger 141.

Route 202 would be used to calculate the road distance between driver 110 and passenger 142. Thereafter, a route from passenger 142 to the office 150 would be determined to calculate the additional road distance from passenger 142 to office 150, and then calculate a total road distance for picking up passenger 142. The process would then continue for each of the other passengers 143 to 145.

In addition to calculating the total road distances for picking up each passenger, the algorithms also calculated the estimated travel times for picking up each passenger. These estimated travel times were calculated by applying an expected vehicle speed, which may be based on a known speed limit, to the calculated road distances. The estimated travel times would then be compared to the maximum travel time the driver is willing to accept to determine whether it is feasible for the carpool driver to pickup and dropoff the passenger within the maximum travel time window provided by the driver.

For drivers who have the capacity to accept more than one passenger, the system would then continue the calculations to calculate the total road distances and travel times for picking up different combinations of passengers up to the capacity of the carpool driver's vehicle. The calculated travel times would then be compared to the maximum travel time the driver is willing to accept to determine whether it is feasible for the carpool driver to pickup and dropoff each combination of passengers within the maximum travel time window provided by the driver.

Performing each of the calculations in situations where there are many drivers and many passengers becomes computationally intensive. This is part because the system must first identify the shortest road distances and/or travel times between each of the points. This may involve checking several different route options for each set of points. As the number of drivers, passenger, and vehicle capacities increases, the number of calculations required may increase exponentially. With hundreds of passengers and drivers with different passenger capacities, the number of the calculations to be performed has slowed response times to the point where the system can no longer process changes in real time or even near real time.

In existing carpooling systems, the carpooling system may present a user with a list of carpooling options and the user may manually select one of the carpooling options. Thereafter, changes may be submitted if a user or other participant is no longer able to participate in the scheduled carpool. For example, a carpool participant may get sick or have a meeting rescheduled and therefore may need to cancel and/or reschedule a carpool. In existing carpooling systems, the carpool participants who are no longer able to participate in the carpool would have to manually notify each of the other participants of the cancellation or rescheduling. Thereafter, the carpool system would search for alternative carpool assignment options that would still be acceptable to the remaining participants. Once the system found alternative carpool assignment options, the system would notify each of the participants of the new carpool options.

In the past, if one of several passengers in an assigned carpool submits a cancellation, the carpool system would notify each of the other passengers that the carpool was cancelled. Thereafter, the carpool system would search for alternative carpool assignments, and often ended up presenting the same carpooling option to the remaining passengers and the original carpool driver, though without the passenger who submitted the cancellation. Thus, in the span of several minutes, the remaining passengers and the driver would initially receive a notification that the carpool assignment was cancelled, and then subsequently receive a notification that they could choose the same carpool assignment, though this time without the canceling passenger. Users of the carpooling system found this to be frustrating and undesirable.

Also, in the past, if a participant in an assigned carpool submits a request to reschedule the carpool to a different time, the carpool system would notify each of the passengers in the assigned carpool that the carpool was cancelled. Thereafter, the carpool system would search for alternative carpool assignments, and would often end up notifying the passengers and the driver that the same carpool was available at the rescheduled time, provided that the rescheduled time was minor and within an acceptable traveling time period of the other participants. Thus, in the span of several minutes, each of the passengers and the driver would initially receive a notification that the carpool assignment was cancelled, and then subsequently receive a notification that the same cancelled carpool was still available, though at the rescheduled time. Users of the carpooling system found this to be frustrating and undesirable.

There is a need for large scale carpooling systems to perform calculations more efficiently to enable the processing of carpooling requests in real time or near real time. There is also a need for carpooling systems to automatically assign carpool participants to carpools and avoid sending unnecessary cancellation notifications to carpool participants when processing cancellation and/or rescheduling requests.

DETAILED DESCRIPTION

In an embodiment of the invention, distances between locations may be initially estimated by calculating a direct, straight line distance between two location points. Travel speeds may also be initially estimated using an expected maximum vehicle speed, which may a maximum speed limit, such as a maximum speed allowed on a fastest street in the area. An estimated travel time may then be calculated from the straight line distance and expected maximum vehicle speed.

These estimates will likely underestimate the total distance and travel time between two points, since the actual road distance will likely be longer than the straight line distance between the two points, and the vehicle will likely travel at speeds less than the maximum vehicle speed for at least some portion of the trip. Thus, if the estimated total travel time for a carpool driver to pickup and dropoff a carpool passenger exceeds a maximum travel time of the carpool driver, it would not be feasible, even assuming ideal conditions, for the carpool driver to carpool with the passenger with the maximum travel time of the driver. This particular passenger may therefore be designated as ineligible for carpooling with this driver without the need to calculate the actual road distances and actual travel times between the carpool driver and the passenger.

In situations where drivers and passengers are scattered through a geographic region, it is likely that each driver will only be eligible to carpool with a small subset of potential passengers; most of the passengers will likely be located too far away from the driver to make it practical for the driver to carpool with them in a reasonable amount of time. Thus, using this estimated straight line distances and estimated maximum speeds may quickly exclude the majority of these ineligible passengers without the need for computationally intensive road distance calculations and route selection optimizations.

Once a list of passengers eligible for carpooling with a driver has been generated from the estimated travel distances and/or travel times, an actual shortest route to pickup and drop off each eligible passenger may then be identified. An actual road distance of the identified shortest route may then be calculated. Expected travel speeds on each of the roads of the identified shortest route may also be used to calculate a more accurate expected travel time. If the more accurate expected travel time is less than or equal to the maximum travel time of the carpool driver, then the passenger may be designated as approved for carpooling with that driver. Otherwise, if the more accurate expected travel time is more than the maximum travel time of the carpool driver, then the passenger may be designated as ineligible for carpooling with that driver.

After passengers and drivers have been assigned to carpools and notified of their assigned carpools, a cancellation request may be sent to the carpool system by one of the participants in an assigned carpool. The carpool system may determine whether it is possible to conduct the carpool without the participant submitting the cancellation. If the carpool may still be conducted, the carpool may continue and a notification may be sent to the driver of the assigned carpool to inform the driver of the cancellation.

If the carpool cannot be conducted, the system may search its records to identify a driver or passenger whose inclusion in the assigned carpool would enable the carpool to be conducted. If the system is able to identify such as driver or passenger, the system may assign the respective driver or passenger to the carpool and send notifications to the participants of the modified assigned carpool. Only, if the system is not able to identify a driver or passenger to complete the carpool would the system send a notification to the non-canceling participants that the carpool is cancelled.

Figure 3A:
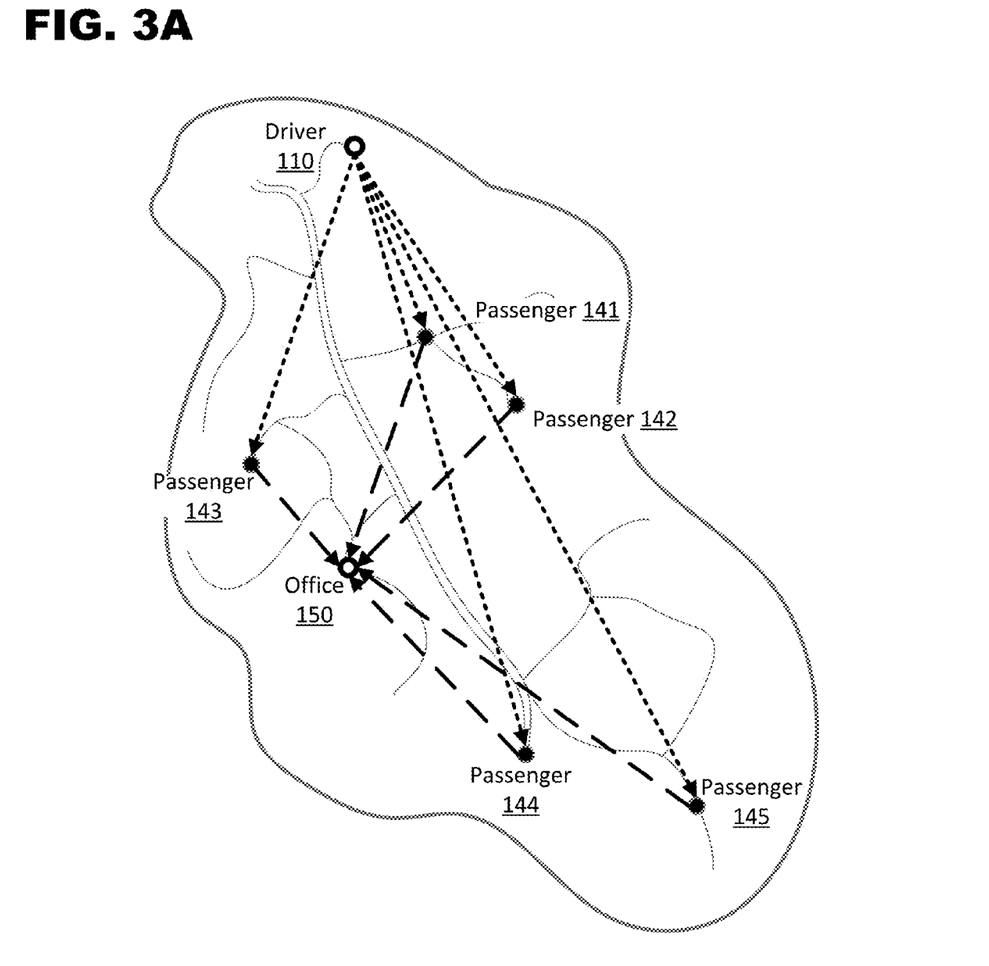
FIG. 3A shows a first example of how straight line distances may be calculated in an embodiment of the invention.

FIG. 3A shows a first example of how straight line distances may be calculated in an embodiment. This example assumes that the driver 110 and each of the passengers 141 to 145 are all traveling to the same office 150. In other embodiments, some or all of the passengers 141 to 145 may be traveling to different locations from the other passengers and/or the driver 110. In these situations, the straight line distance calculations may include the additional straight line distances from the pickup location of the passengers 141 to 145 to their respective drop off locations and then on to the final destination of the driver 110.

The straight line distances may be calculated for each passenger by measuring the straight line distance from the starting location of the driver to the pick up location of the respective passenger. Then the straight line distance from the pick up location of the respective passenger to the drop off location of the passenger, may be measured and added to the straight line distance between the starting location of the driver and the pickup location of the passenger. Since in this example, the office 150 drop off location of each passenger 141 to 145 is also the final destination of the driver 110, the total straight line distance calculation may be considered complete. In subsequent iterations in which one or more additional passengers may be added to the carpool, these previously calculated straight line distances may be used to calculate a total estimated minimum travel time for the carpool driver to pick up and/or drop each off the passengers.

Figure 3B:
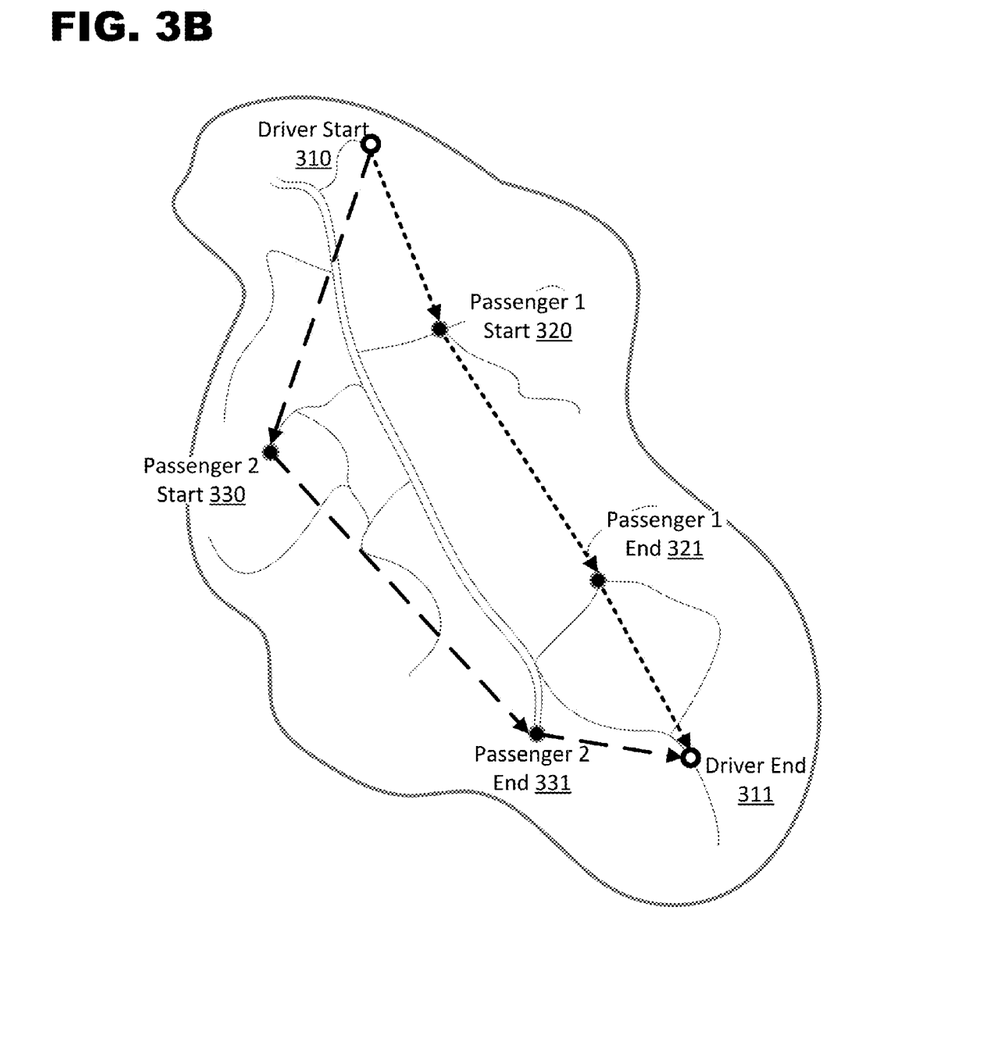
FIG. 3B shows a second example of how straight line distances may be calculated in an embodiment of the invention.

FIG. 3B shows a second example of how straight line distances may be calculated in an embodiment. This example assumes that the driver 310 and each of the two passengers all have different starting and ending locations 310 to 331, and that the driver's vehicle has capacity to carpool with only one passenger. In this situation, the straight line distance calculations may include the straight line distances between the starting location of the driver 310 to the starting location of each of the two passengers 320 and 330, to the ending location of each respective passenger 321 and 331, and then to the ending location of the driver 311. Since there are two passengers in this example, two total straight line distances may be calculated. The first straight line distance may include the sum of the straight line distances between: (Driver Start Point 310 to Passenger 1 Start 320)+(Passenger 1 Start 320 to Passenger 1 End 321)+(Passenger 1 End 321 to Driver End 311). The second straight line distance may include the sum of the straight line distances between: (Driver Start Point 310 to Passenger 2 Start 330)+(Passenger 2 Start 330 to Passenger 2 End 331)+(Passenger 2 End 331 to Driver End 311).

Figure 3C:
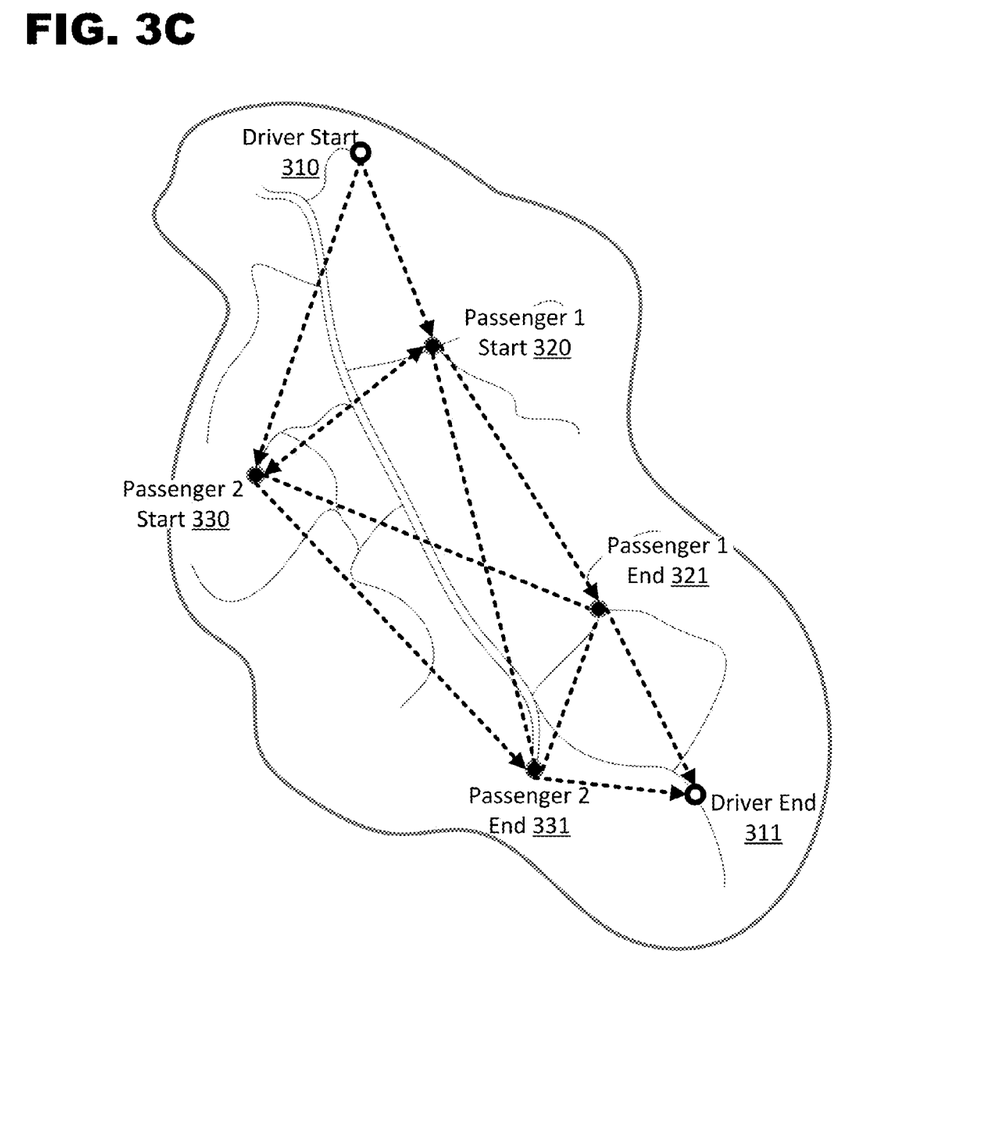
FIG. 3C shows a third example of how straight line distances may be calculated in an embodiment of the invention.

FIG. 3C shows a third example of how straight line distances may be calculated in an embodiment. This example assumes that the driver 310 and each of the two passengers all have different starting and ending locations 310 to 331, and that the driver's vehicle has capacity to carpool with both of the passengers. In this situation, the straight line distance calculations may included the straight line distances between each of following points: the starting location of the driver 310, the starting locations of each of the two passengers 320 and 330, the ending locations of each respective passenger 321 and 331, and the ending location of the driver 311. Additional logic may be include to limit the permutations to realistic events. For example, the logic may be configured to ensure that each permutation: begins with the driver at the starting location 310, ends with the driver at the ending location 311, ensure that each passenger is picked up before they are dropped off, and ensure that the number of passengers in the vehicle at any time does not exceed the vehicle capacity.

According to this logic, the driver may engage in six different passenger pick up and drop off permutations. As the number of drivers, the number of passengers, and/or the passenger capacity of vehicles increases, the number of permutations also increases at a much faster rate. The point to point entries below show each of the different pick up and drop off sequences that the driver may follow in FIG. 3C when picking up and dropping off each of the two passengers:

310→330→320→331→321→311
310→330→320→321→331→311
310→330→331→320→321→311
310→320→330→331→321→311
310→320→330→321→331→311
310→320→321→330→331→311

The straight line distances may be calculated for each passenger by measuring the straight line distance from the starting location of the driver to the pick up location of the respective passenger. Then the straight line distance from the pick up location of the respective passenger to the drop off location of the passenger, may be measured and added to the straight line distance between the starting location of the driver and the pickup location of the passenger. Since in this example, the office 150 drop off location of each passenger 141 to 145 is also the final destination of the driver 110, the total straight line distance calculation may be considered complete.

Figure 4:
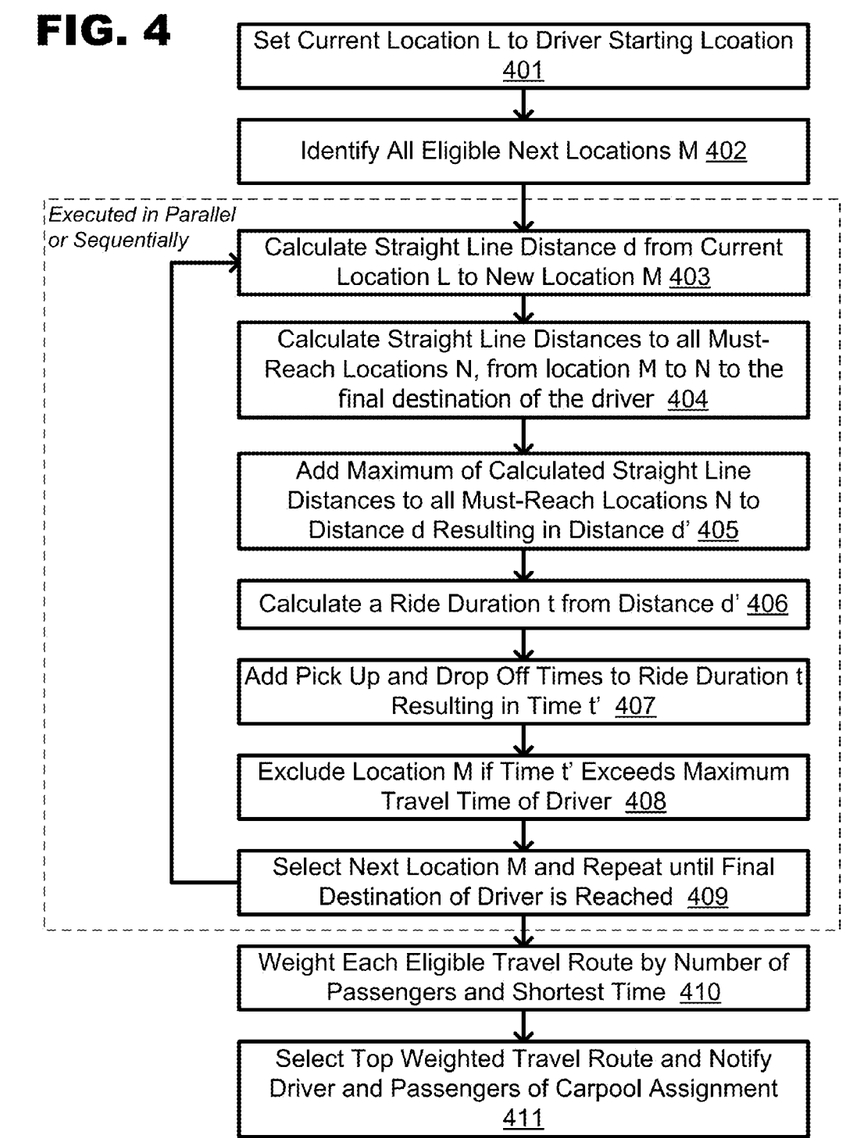
FIG. 4 shows an exemplary process in an embodiment of the invention.

FIG. 4 shows an exemplary process in an embodiment of the invention. In box 401, the process is initialized to start at the starting location of the driver, which may be set at the current location L.

In box 402, the system finds all eligible next locations M that the driver can drive to. In this case, the next locations may be the pick up locations of the passengers P1 or P2. The process may or may not exclude the drop off locations of the passengers at the beginning, but at the end it will be considered illegal anyway since driving first to the drop off locations of the passengers breaks the ride-sharing specific constraint that a passenger must be picked up before she is dropped off.

The process may execute the steps described below in boxes 403 to 409 either in parallel or sequentially.

In box 403, a straight line distance d from the current location L to the new location M is obtained or calculated.

In box 404, the straight line distances may be calculated to all must-reach locations N, which may include drop-off points of passengers that were already picked up, including a new passenger that was picked up at the location M, from location M to N to the final destination of the driver.

In box 405, a maximum of the above calculated distances in box 404 may be added to the distance d in box 403 resulting in d'

In box 406, the distance d' may be changed into a travel time t, either by optimistic approximation based on a maximum vehicle speed and the straight line distances or using a map and/or routing system.

In box 407, an additional time associated with picking up and dropping off each passenger, such as for stopping the vehicle and enabling the passenger to step in and out of the vehicle may be added to the time t resulting in the time t'

In box 408, the location M may be excluded from consideration as a potential stop for the driver if the time t' exceeds a maximum travel time of the driver.

In box 409, the process may select a next location M and go to box 403. The process may repeat until the final destination of the driver is reached.

In box 410, each of the eligible travel routes from location to location as determined in boxes 403 to 409 may be weighted by number of passengers first (generally, the more passengers in a carpool the better for all stakeholders) and shortest travel time next (the less the better for the driver). Alternatively, other weighting functions may also be used in other embodiments. For example, certain areas, such as those considered dangerous, may be weighted differently. In other situations, carpool starting and ending times for driver may be weighted based on a proximity to optimal starting and ending times.

In box 411, the top ranked travel route may be selected and the driver and passengers in the travel route may be assigned to carpool together. Notification may be sent to the driver and the passengers informing them of the carpool assignment.

Figure 5:
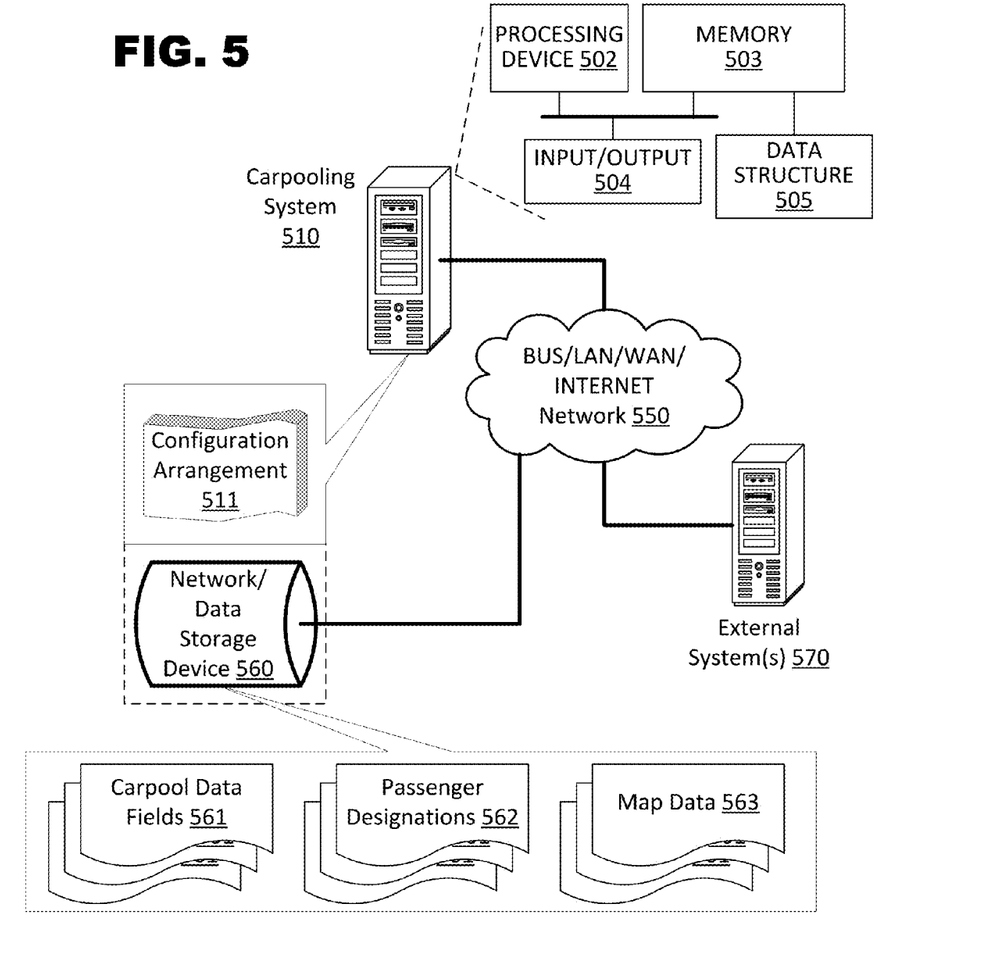
FIG. 5 shows an exemplary architecture in an embodiment of the invention.

FIG. 5 shows an exemplary architecture in an embodiment of the invention. Carpooling system 510 may include a calculating arrangement 511, which may include or use a processing device 502.

The calculating arrangement 511 may include one or more algorithms for calculating distances, travel times, routes, and performing optimizations to select a distance, travel time, or route satisfying predetermined optimization criteria. These algorithms may include algorithms for calculating and aggregating straight line distances between different geographical locations. The algorithms may also include algorithms to identify each possible permutation of routes between multiple geographic locations, and to identify and/or designate those route permutations having the shortest distances. The calculating arrangement 511 may also include or use a processing device 502 to apply the algorithms to a set of data inputs and calculate the result.

Carpooling system 510 may be connected to a network 550. Network 550 may include a LAN, WAN, bus, or the Internet. Carpooling system 510 may interface with other systems and components depending on the application. For example, a network/data storage device 560 may be used to store the different types of data structures, including carpool data fields 561, which may include data fields representing a starting location of the carpool driver, an ending location of the carpool driver, a maximum travel time of the carpool driver, and a passenger capacity of the carpool driver's vehicle; passenger designation fields 562, which may indicate whether a passenger is eligible, ineligible, approved, and/or assigned to carpool with a particular carpool driver; and map data 563, which may store geographic base map data that may be used to identify routes and calculate distances.

The storage device 560 may be a part of the carpooling system 510. In some embodiments the network storage device 560 may also be separate from the carpooling system 510 but connected to it through network 550. The storage device 560 may contain a hard disk drive, flash memory, or other computer readable media capable of storing data. Other external systems and data sources 570 may also be connected to network 550. These other systems 570 may be used to supply additional data or information used by the carpooling system 510, such as, for example, new data from new passengers and new drivers willing to carpool, or updates, cancellations, or changes from existing passengers and drivers.

Each of the systems, clients, and devices in FIG. 5 may contain a processing device 502, memory 503 storing loaded data or a loaded data structure 505, and an communications device 504, all of which may be interconnected via a system bus. In various embodiments, each of the systems 510, 560, and 570 may have an architecture with modular hardware and/or software systems that include additional and/or different systems communicating through one or more networks. The modular design may enable a business to add, exchange, and upgrade systems, including using systems from different vendors in some embodiments. Because of the highly customized nature of these systems, different embodiments may have different types, quantities, and configurations of systems depending on the environment and organizational demands.

Communications device 504 may enable connectivity between the processing devices 502 in each of the systems and the network 550 by encoding data to be sent from the processing device 502 to another system over the network 550 and decoding data received from another system over the network 550 for the processing device 502.

In an embodiment, memory 503 may contain different components for retrieving, presenting, changing, and saving data. Memory 503 may include a variety of memory devices, for example, Dynamic Random Access Memory (DRAM), Static RAM (SRAM), flash memory, cache memory, and other memory devices. Additionally, for example, memory 503 and processing device(s) 502 may be distributed across several different computers that collectively comprise a system.

Processing device 502 may perform computation and control functions of a system and comprises a suitable central processing unit (CPU). Processing device 502 may include a single integrated circuit, such as a microprocessing device, or may include any suitable number of integrated circuit devices and/or circuit boards working in cooperation to accomplish the functions of a processing device. Processing device 502 may execute computer programs, such as object-oriented computer programs, within memory 503.

In some instances, after carpool passengers and drivers have been assigned to respective carpools, one or more of the participants in the carpool may decide that the carpool assignment is no longer suitable and they may cancel their participation in the carpool. The cancellation may also be part of a request to reschedule a carpool time. Participants may cancel and/or reschedule the assigned carpools for a variety of reasons, including illness, change of plans, inclement weather, and so on.

Figure 6:
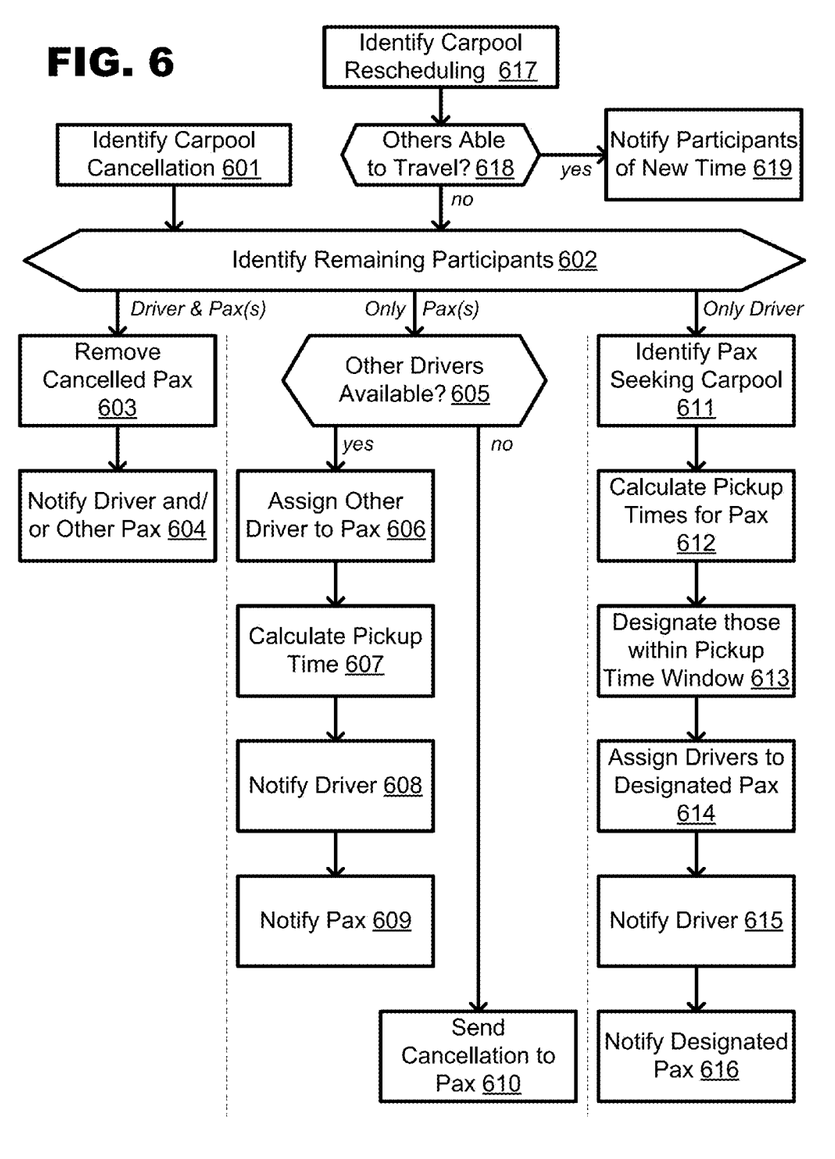
FIG. 6 shows another exemplary process in an embodiment of the invention.

FIG. 6 shows an exemplary process for facilitating the reassignment and/or rescheduling of carpool assignments in the event of a cancellation or rescheduling. In box 601, a cancellation of a person's participation in an assigned carpool may be identified. The person canceling may be a passenger or a driver in an assigned carpool.

In some instances, instead of or in addition to a cancellation, a request to reschedule a carpool may also be processed. In box 617, a carpool rescheduling request may be identified. In box 618, the system may determine whether the other participants in the carpool are able to travel at the rescheduled times, by, for example, comparing the travel time periods of each carpool participant to the expected revised pick up and/or drop off times according to the rescheduling request. In box 619, if the other participants are able to travel at the rescheduled times, the system may send notifications to those participants of the rescheduled times. In box 618, if the other participants are not able to travel at the rescheduled times, the system may treat the request to reschedule as a cancellation by the participant submitting the request and go to box 602.

In box 602, the remaining participants in the assigned carpool may be identified to determine whether the assigned carpool still includes a driver and at least one passenger after the cancelled person is removed from the carpool.

Boxes 603 and 604 indicate an exemplary process that may be followed if the identified remaining participants in the assigned carpool still includes the driver and at least one passenger. In box 603, the canceling person may be removed from the assigned carpool in the carpool system records.

In box 604, a notification may be sent to the driver to inform the driver of the cancellation so that the driver is aware of the cancellation and does not waste time attempting to pickup the canceling person. In some instances, notifications may also be sent to remaining passengers in the carpool if there is a substantial change to their pick up and/or drop off times in view of the cancellation.

Boxes 605 to 610 indicate an exemplary process that may be followed if the identified remaining participants in the assigned carpool no longer includes the driver and only includes one or more passengers. In box 605, an availability of other drivers in the carpool system may be checked to determine whether an other driver is available to pickup one or more of the remaining passengers in the assigned carpool.

Boxes 606 to 609 indicate an exemplary process that may be followed if an other driver is available to pickup one or more of the remaining passengers. In box 606, an available other driver may be assigned by the carpool system to pickup the one or more remaining passengers.

In box 607, an estimated time the assigned driver will pickup each of the assigned passengers may be calculated based on a predetermined departure time of the assigned driver and a location of each assigned passenger.

In box 608, a notification may be sent to the assigned driver to pickup each assigned passenger at the respective estimated time.

In box 609, a notification may be sent to each assigned passenger that the assigned driver will pick them up at the respective estimated time.

In box 610, if none of the other drivers are available to pickup one or more of the remaining passengers, a notification may be sent to those passengers who can not be picked up that their carpool assignment has been cancelled.

Boxes 611 to 616 indicate an exemplary process that may be followed if the identified remaining participants in the assigned carpool no longer includes any passengers and only includes the driver. In box 611, a memory of the carpool system may be searched to identify at least one passenger that has not been assigned to a carpool and is still seeking a carpool assignment.

In box 612, an estimated time the driver will pickup each identified passenger seeking the carpool assignment may be calculated based on the predetermined departure time of the assigned driver and a location of each respective passenger.

In box 613, those passengers whose calculated estimated pickup by the driver occurs within a pickup time window provided by those passengers may be designated as eligible for carpooling with the driver.

In box 614, the driver may be assigned in the carpooling system to at least one of the passengers designated as eligible for carpooling with the driver.

In box 615, a notification may be sent to the driver to pickup each assigned eligible passenger at the respective estimated time.

In box 616, a notification may be sent to each assigned eligible passenger that the assigned driver will pick up the assigned eligible passenger at the respective estimated time.

The above process may be used in one-way or multi-segment carpools. Multi-segment carpools may include round-trip carpools or multiple destination carpools. In the case of round-trip or multiple destination carpools, the process may be configured to preserve ride continuity, so that either the entire round-trip or each of the multiple destinations are able to be completed or the entire trip is cancelled. This feature, when used, may prevent stranding of carpool passengers. For example, if a passenger is initially assigned to a first carpool to get to work from home at the beginning of a shift and then a second carpool to get from work to home at the end of a shift, then a cancellation or rescheduling of the second carpool that prevents the passenger from participating in the second carpool may cause the system to cancel both the first and the second carpools for that passenger if another suitable carpool can not be found for the passenger. This may prevent the passenger from getting stranded at work at the end of the shift due to the lack of a ride home.

In some instances, drivers may be assigned to passengers according to an optimization that may minimize the total travel time for the driver. For example, a total travel time for the driver to pick up and drop off each passenger designated as eligible for carpooling with the driver may be calculated. The driver may be then be assigned to the eligible passenger that results in a lowest calculated total travel time.

An estimated time the driver will arrive at a final destination after picking up and dropping off each passenger designated as eligible for carpooling with the driver may also be calculated for each identified passenger seeking a carpool assignment. If the calculated estimated time the driver will arrive at the final destination occurs after a desired arrival time of the carpool driver, then each of those passenger may be designated as ineligible for carpooling with the driver.

In some instances, the notifications that may be sent to the driver and/or any passengers may be sent as email messages, short message service (SMS) messages, instant messages, or other forms of notification.

A cancellation may also be part of a request to reschedule a person's participation in a carpool. In these instances, the cancellation may be processed to identify whether the cancellation includes a request to reschedule the driver's participation in the assigned carpool.

If the cancellation includes a request to reschedule a driver's participation in the assigned carpool, then the following may occur:

First, an estimated rescheduled time the driver will pickup each passenger in the assigned carpool may be calculated based on the rescheduled departure time of the assigned driver and a location of the respective passenger.

Then, those passengers in the assigned carpool having their estimated rescheduled pickup time occurring within a pickup time window provided by those passengers may be identified.

Thereafter, a notification may be sent to the driver to pickup at the rescheduled time those identified passengers in the assigned carpool having their estimated rescheduled pickup time occurring within the pickup time window provided by the passengers.

Finally, a notification may also be sent to those identified passengers in the assigned carpool having their estimated rescheduled pickup time occurring within the pickup time window provided by the passengers that the assigned driver will pick up the assigned eligible passenger at the respective rescheduled estimated pickup time.

In those situations where passengers in the assigned carpool have their estimated rescheduled pickup times occurring outside the pickup time window provided by those passengers, the following may occur:

First, the availability of other drivers in the carpool system may be checked to determine whether at least one of the other drivers is available to pickup at least one of those passengers in the assigned carpool having their estimated rescheduled pickup time occurring outside the pickup time window provided by those passengers.

If one or more of the other drivers are available to pickup at least one of those passengers in the assigned carpool having their estimated rescheduled pickup time occurring outside the pickup time window provided by those passengers, then one of the available drivers may be assigned to at least one of the respective passengers. Additionally, an estimated time the assigned drivers will pickup each of the assigned passengers may be calculated based on a predetermined departure time of the assigned drivers and a location of the assigned passengers. A notification may also be sent to the assigned drivers to pickup their assigned passengers at the respective estimated time. Finally, a notification may be sent to the assigned passengers that the assigned drivers will pick them up at the respective estimated time.

If none of the other drivers are available to pickup at least one of the passengers, a notification may be sent to those passengers who can not be picked up that their carpool assignment has been cancelled.

If the cancellation includes a request to reschedule a passenger's participation in the assigned carpool, then an estimated rescheduled time the driver will depart to pickup the rescheduling passenger at the rescheduled time may be calculated based on the rescheduled time provided by the rescheduling passenger and a location of the rescheduling passenger. Thereafter, the calculated rescheduled departure time for the driver may be checked to identify if it occurs within a travel time window of the driver. If the calculated rescheduled departure time for the driver occurs within the travel time window of the driver, a notification to the driver to pickup the rescheduling passenger at the rescheduled time and a notification may be sent to the rescheduling passenger that the driver will pick up the rescheduling passenger at the rescheduled time.

In some instances, an estimated rescheduled pickup time may also be calculated for each passenger in the assigned carpool other than the rescheduling passenger. A determination may be made to identify whether the calculated estimated rescheduled pickup time for each passenger occurs within the pickup time window provided by those passengers. If the calculated estimated rescheduled pickup time occurs within the pickup time windows, a notification may be sent to each of the passengers informing them of their rescheduled pickup times.

The foregoing description has been presented for purposes of illustration and description. It is not exhaustive and does not limit embodiments of the invention to the precise forms disclosed. Modifications and variations are possible in light of the above teachings or may be acquired from the practicing embodiments consistent with the invention. For example, the calculating arrangement may include one or more integrated circuits and/or microprocessing units separate from the processing device in some embodiments, but in other embodiments, the calculating arrangement may use the processing device to perform one or more computations or calculations.

I claim:

1. A computer-implemented method comprising:

setting a current location L of a carpool driver to a starting location of the carpool driver in an initial iteration of the method, wherein the current location L updates with a location change of the driver;

identifying, using a processing device, an eligible next location M for the carpool driver to drive;

identifying, using the processing device, a distance d from the current location L to the next location M;

calculating a plurality of distances from the next location M to all must-reach locations N to a final destination of the carpool driver;

identifying a maximum of the plurality of distances from the next location M to all must-reach locations N to a final destination of the carpool driver;

adding the identified maximum to the distance d to calculate a distance d';

calculating a travel time t from the distance d' based on an optimistic approximation using the processing device;

adding an additional time for picking up and dropping off each passenger to the travel time t to calculate a total time t';

excluding the location M as a potential stop for the driver in a travel route if the time t' exceeds a maximum travel time of the driver;

selecting a next location M' and repeating the method until a final destination of the driver is reached to identify all travel routes and potential stops;

weighting each identified travel route by a number of passengers picked up and a shortest one (t") of the total times t' associated with the identified travel route;

selecting a top weighted travel route; and assigning the driver and passenger(s) in the top weighted travel route to a carpool.

2. The method of claim 1, further comprising excluding passenger pick up locations in situations where a passenger capacity of the carpool driver is exceeded.

3. The method of claim 1, wherein the optimistic approximation is calculated using a predetermined vehicle speed.

4. The method of claim 3, wherein the predetermined vehicle speed is selected to be a maximum speed limit.

5. The method of claim 1, further comprising after initially identifying all travel routes and potential stops using straight line distances, recalculating actual road distances of each travel route from mapping information, recalculating the travel times t and the total times t' from the actual road distances, and excluding the location M as a potential stop for the driver in a respective travel route if the recalculated total time t' exceeds the maximum travel time of the driver.

6. The method of claim 5, further comprising:

identifying a speed limit on a plurality of road segments included in at least one travel route; and using the identified speed limit in the recalculation of the travel times t and the total times t'.

7. The method of claim 6, wherein when weighting each identified travel route by the number of passengers picked up and the shortest travel time t", a higher weight is assigned to the number of passenger picked up than the shortest travel time t".

8. The method of claim 6, wherein when weighting each identified travel route by the number of passengers picked up and the shortest travel time t", a higher weight is assigned to the travel route as the number of passenger picked up increases.

9. The method of claim 1, further comprising:

sending a notification of the carpool assignment to the assigned driver and passenger(s) in the top weighted travel route.

10. The method of claim 1, wherein at least one distance is initially calculated using a straight line distance between two points and subsequently recalculated using an actual road distance between the two points.

11. A non-transitory computer readable medium comprising a set of instructions stored in the medium that, when executed by a processing device, cause the processing device to:

set a current location L of a carpool driver to a starting location of the carpool driver in an initial iteration of the method, wherein the current location L updates with a location change of the driver;

identify an eligible next location M for the carpool driver to drive;

identify a distance d from the current location L to the next location M;

calculate a plurality of distances from the next location M to all must-reach locations N to a final destination of the carpool driver;

identify a maximum of the plurality of distances from the next location M to all must-reach locations N to a final destination of the carpool driver;

add the identified maximum to the distance d to calculate a distance d';

calculate a travel time t from the distance d' based on an optimistic approximation using the processing device;

add an additional time for picking up and dropping off each passenger to the travel time t to calculate a total time t';

exclude the location M as a potential stop for the driver in a travel route if the total time t' exceeds a maximum travel time of the driver;

select a next location M' and repeating the method until a final destination of the driver is reached to identify all travel routes and potential stops;

weight each identified travel route by a number of passengers picked up and a shortest one (t") of the total times t';

select a top weighted travel route; and assign the driver and passenger(s) in the top weighted travel route to a carpool.

12. The non-transitory computer readable medium of claim 11, wherein passenger pick up locations are excluded in situations where a passenger capacity of the carpool driver is exceeded.

13. The non-transitory computer readable medium of claim 11, wherein the optimistic approximation is calculated using a predetermined vehicle speed.

14. The non-transitory computer readable medium of claim 13, wherein the predetermined vehicle speed is selected to be a maximum speed limit.

15. A system comprising:

a memory device;

a processing device; and a calculating arrangement, wherein:

the processing device sets an initial value of a current location L of a carpool driver to a starting location of the carpool driver wherein the current location L updates with a location change of the driver in the memory device, identifies an eligible next location M for the carpool driver to drive, identifies a distance d from the current location L to the next location M;

the calculating arrangement calculates a plurality of distances from the next location M to all must-reach locations N to a final destination of the carpool driver, identifies a maximum of the plurality of distances from the next location M to all must-reach locations N to a final destination of the carpool driver, adds the identified maximum to the distance d to calculate a distance d', calculates a travel time t from the distance d' based on an optimistic approximation using the processing device, adds an additional time for picking up and dropping off each passenger to the travel time t to calculate a total time t', excludes the location M as a potential stop for the driver in a travel route if the total time t' exceeds a maximum travel time of the driver, selects a next location M' and repeating the setting of the current location L and the calculation until a final destination of the driver is reached to identify all travel routes and potential stops, weights each identified travel route by a number of passengers picked up and a shortest one (t") of the total times t' associated with the identified travel route, selects a top weighted travel route, and assigns the driver and passenger(s) in the top weighted travel route to a carpool.

16. The system of claim 15, wherein the calculating arrangement calculates the optimistic approximation using a predetermined vehicle speed.

17. The system of claim 16, wherein the predetermined vehicle speed is selected to be a maximum speed limit.

18. A computer-implemented method comprising:

setting a current location L of a potential route to a starting location of the potential route in an initial iteration of the method, wherein the current location L updates as the method progresses;

identifying, using a processing device, an eligible next location M of the potential route;

calculating, using the processing device, a shortest distance d from the current location L to the next location M and a longest straight line distance d' from the next location M to all must-reach locations N to a final destination of the potential route;

calculating a fastest time t to travel the distances d and d' based on an optimistic approximation using the processing device;

excluding the location M as a potential route for the driver if the time t exceeds a maximum travel time of the driver;

selecting a next location M' and repeating the method until each location has been selected to check all potential routes;

weighting each non-excluded potential route by a predetermined criterion; and selecting a top weighted route as a final route.

* * * * *